United States Patent [19]

Chretien

[11] 4,079,537
[45] Mar. 21, 1978

[54] ICE FISHING TRAP

[76] Inventor: James F. Chretien, 215 Guinea Rd., Biddeford, Me. 04005

[21] Appl. No.: 740,887

[22] Filed: Nov. 11, 1976

[51] Int. Cl.² ............................................. A01K 97/12
[52] U.S. Cl. ......................................................... 43/17
[58] Field of Search ............................................. 43/17

[56] References Cited

U.S. PATENT DOCUMENTS

| 75,075 | 3/1868 | Talbot | 43/17 |
|---|---|---|---|
| 962,420 | 6/1910 | Dibbles | 43/17 |
| 1,443,981 | 2/1923 | Eccleston | 43/17 |
| 2,470,610 | 5/1949 | Elsemore | 43/17 |

Primary Examiner—Louis G. Mancene
Assistant Examiner—Daniel J. Leach

[57] ABSTRACT

An ice fishing trap has a support dimensioned to span a hole in the ice and provided with a reel. A rod has a flag at one end, a line holder at the other end and a weight slidable on that end between a transverse pivotal connection with the support and the line holder. When the trap is set, the weight is remote from the line holder and is overbalanced by the flag end of the rod but when the baited hook is taken by a fish, the rod tilts causing the weight to slide ensuring that the flag end is raised with the line free.

4 Claims, 3 Drawing Figures

U.S. Patent    March 21, 1978    4,079,537
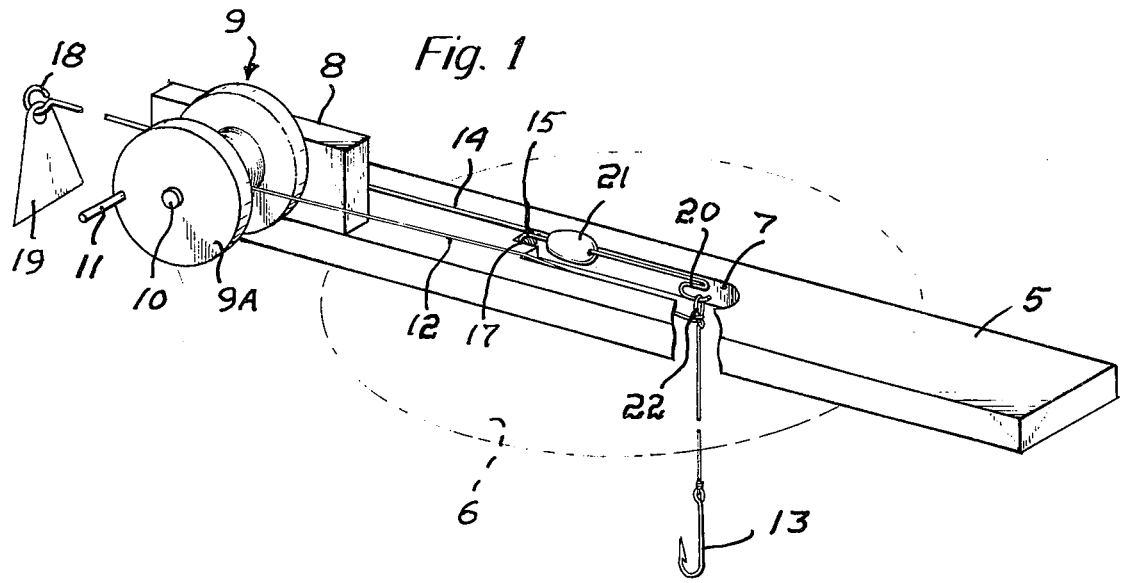
Fig. 1
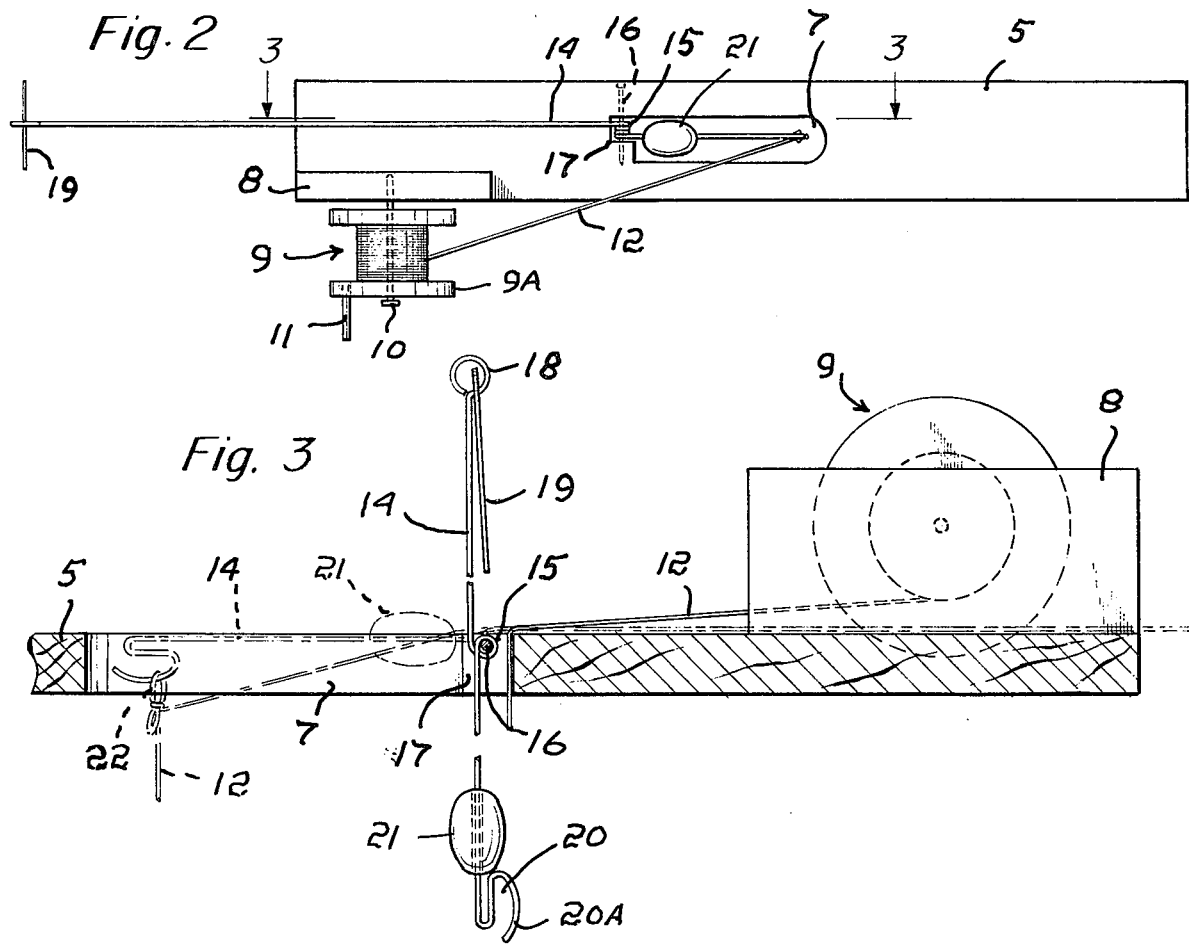
Fig. 2
Fig. 3

ICE FISHING TRAP

BACKGROUND REFERENCES

U.S. Pat. No. 1,406,038
U.S. Pat. No. 2,470,610

BACKGROUND OF THE INVENTION

Ice fishing is a popular winter sport and many types of ice fishing traps have been proposed.

Each such trap has means to so support a line that its baited hook or hooks can be lowered through a hole in the ice to the desired depth together with means responsive to the taking of the bait by a fish to signal the fisherman of that fact. In one type of trap, a flag attached to a length of spring steel is held tensioned by a catch to which a loop in the line is caught in a manner such that the catch is released and the line freed in response to a pull on the line by a fish. In another type, a support had a member connected thereto with a flag at one end and a catch at the other end to which the loop in the line was caught in a manner such that the member pivoted in response to a strike to position the flag end of the member uppermost, sometimes with a slidable weight that shifted in response to the taking of the baited hook by a fish to hold the flag in its signalling position.

While traps operating on both principles are widely used, the demand is for simpler and less expensive traps that will function reliably under all conditions.

THE PRESENT INVENTION

The general objective of the present invention is to provide ice fishing traps that will meet the above generally described demand, an objective attained with an ice fishing trap consisting of a stable support dimensioned to span a hole in the ice of a predetermined maximum width and having a reel mounted thereon. A rod is pivotally connected to the support to swing vertically from a first substantially horizontal position into a second position in which a flag is secured to one end thereof and becomes visible. At the other end of the rod, there is a holder on which a loop in the line from the reel is caught and a weight is slidably supported by that end of the rod.

When the trap is set, the weight is close to the pivot axis of the rod and the weight carrying end of the rod, which is relatively short, is overbalanced by its longer flag carrying end. When a fish grabs the baited hook, a downward pull on the rod not only causes the weight to slide forwardly to overbalance the flag carrying portion of the rod but also permits the loop in the line to slip from the holder.

Another objective of the invention is to enable the trap to be made with inexpensive and readily available components, an objective attained with the support a length of wood dimensioned to span a hole in the ice of a predetermined maximum width and of a width rendering it stable in use and provided with a centrally located slot dimensioned to accommodate the weight carrying end of the rod and having a pocket through the walls of which the pivot extends by which the rod is secured. The rod is of stock that is sufficiently bendable to enable a series of small coils to be formed to receive the pivot.

BRIEF DESCRIPTION OF THE DRAWINGS

A preferred embodiment of the invention is illustrated by the accompanying drawings with FIG. 1 a perspective view of an ice fishing trap in accordance with the invention in its set position;

FIG. 2 is a plan view thereof; and

FIG. 3 is a section, on an increase in scale taken approximately along the indicated line 3—3 of FIG. 2 and showing the relationship of its parts as they would be after a fish seized the baited hook.

THE PREFERRED EMBODIMENT OF THE INVENTION

The ice fishing trap illustrated by the drawings has a flat support 5 that is of a length sufficient to span a hole 6 in the ice that is of a predetermined maximum width and of a width such that the trap has lateral stability when spanning such a hole with its ends resting on the ice marginally thereof. The support 5, if of pine stock, as it preferably is, may be one-half inch thick and an inch and one-half in width by way of example and not of limitation.

The support 5 has a centrally located slot 7 and at its rear end, a mount 8 to which a reel 9 is attached by a pivot 10 in a position to turn freely when the trap is in use. The outer flange 9A of the reel 9 has a handle 11 enabling the line 12 to be reeled in, the line 12 shown as having a hook 13 tied to its free end. In practice, the mount 8 is a block of wood nailed to the support 5 and the pivot 10 for the reel 9, which may be a tin or plastic spool, is or may be an aluminum nail.

A metal rod 14, desirably a brass rod, has an intermediate series of coils 15, in practice four in number, the coils of a diameter to provide a close but free fit on a pivot 16 and of an axial extent to be a free fit in a narrow pocket 17 at the rear end of the slot 7. In practice, the pivot 16 is a heavy brad of a length to extend from the side edge of the support 5 nearest the pocket 17 through the coils 15 and into the wood on the opposite side of the pocket. It will be seen that the coils 15 are so formed and the pivot 16 so located that the flag end portion of the rod rests on the upper surface of the support 5. At its rear end, the rod 14 has a loop 18 securing a colored flag 19 and at its other or front end, the rod is bent to provide a transversely offset forwardly opening U-shaped holder 20, the lower arm of which is bent slightly upwardly as at 20A. A weight 21 is slidably held by the rod 14 between the coils 15 and the holder 20.

The coils 15 are so located that the portion of the rod 14 forwardly thereof fits freely within the slot 7 and that the portion rearwardly thereof will have sufficient weight to overbalance the forward portion when the weight 21 is positioned close to the coils 15 as it is when the trap is set. A loop 22, formed in the line 12, is spaced from the hook 13 a distance such that the baited hook will be at a desired depth when the loop 22 is caught on the holder arm 20A.

With the set trap then spanning the hole 6 and resting on the ice, a fish taking the baited hook exerts a sufficient pull to tilt the rod 14 with only a slight tilting necessary to initiate movement of the weight 21 into a position in which the flag end of the rod is overbalanced, thus simultaneously alerting the fisherman and freeing the line from the holder 20.

I claim:

1. An ice fishing trap comprising a stable support of a length to span a hole in the ice of a predetermined maximum size, said support having a lengthwise slot between its ends located to be substantially centered over the hole when the support is positioned with its ends held by the ice marginally thereof, a rod including a holder at one end and a flag at the other end, a weight slidable on the rod towards and away from said holder, pivot means connecting said rod between the ends thereof to said support with the holder end of the rod and the weight freely confined within the slot and in a location enabling said rod to swing between a first substantially horizontal position and a second substantially vertical position and establishing a flag end portion of a length sufficiently greater than the holder end to overbalance the latter and the weight thereon when the weight is in a position close to the pivot means axis but to be overbalanced by the holder end and the weight when the weight moves towards the holder, and a reel mounted on said support rearwardly of the pivot means whereby with the rod in its first position and the line wound on the reel provided with a hook and a loop spaced a selected distance from the hook, the line between the reel and the loop may be disposed over and against the support to enable the loop to be caught by the holder, and the hook and line between the hook and the loop to extend downwardly through the slot as a guide therefor, a pull on the line then so pivoting the rod as to initiate the sliding of the weight towards the holder as to overbalance the flag end portion of the rod and effect the second position thereof and permit the loop to drop from the holder.

2. The ice fishing trap of claim 1 in which the reel is mounted on the support in a manner such that it is free to turn while the support is held by the ice with the slot over the hole therein.

3. The ice fishing trap of claim 1 in which the pivot means includes a pivot extending transversely of the end of the slot adjacent the reel and the rod includes a plurality of pivot-confining turns and of an axial extent substantially equal to the width of the slot adjacent the pivot.

4. The ice fishing trap of claim 3 in which the slot has a narrow pocket at the end which is traversed by the pivot.

* * * * *